US010679224B2

(12) United States Patent
Osewalt

(10) Patent No.: US 10,679,224 B2
(45) Date of Patent: Jun. 9, 2020

(54) METHOD AND APPARATUS FOR QUICK RESPONSE CODES FOR NEGOTIABLE INSTRUMENTS

(75) Inventor: Richard Osewalt, Whitsett, NC (US)

(73) Assignee: Deluxe Corporation, Shoreview, MN (US)

(*) Notice: Subject to any disclaimer, the term of this patent is extended or adjusted under 35 U.S.C. 154(b) by 0 days.

(21) Appl. No.: 13/403,646

(22) Filed: Feb. 23, 2012

(65) Prior Publication Data

US 2013/0226714 A1 Aug. 29, 2013

(51) Int. Cl.
*G06Q 30/02* (2012.01)

(52) U.S. Cl.
CPC .................... *G06Q 30/02* (2013.01)

(58) Field of Classification Search
USPC ............. 235/375, 379; 705/17, 14.26, 26.65, 705/14.33, 44, 42, 26.62, 14.38, 319, 306, 705/14.44; 358/1.15; 725/5; 715/788
See application file for complete search history.

(56) References Cited

U.S. PATENT DOCUMENTS

| | | | | |
|---|---|---|---|---|
| 6,976,226 B1* | 12/2005 | Strong | .............. | G06F 17/30905 715/788 |
| 7,446,892 B1* | 11/2008 | Churchill | .......... | G06F 17/30011 358/1.15 |
| 2005/0097046 A1* | 5/2005 | Singfield | .............. | G06Q 20/042 705/42 |
| 2005/0132267 A1* | 6/2005 | Aviv | .......................... | 715/500.1 |
| 2006/0144924 A1* | 7/2006 | Stover | .................. | G06Q 20/042 235/379 |
| 2007/0271501 A1* | 11/2007 | Vasilik | .............. | G06F 17/30861 715/234 |
| 2008/0086420 A1* | 4/2008 | Gilder | .................... | G06Q 20/04 705/44 |
| 2008/0140506 A1* | 6/2008 | Christianson | .......... | G06Q 30/02 705/14.44 |
| 2008/0215485 A1* | 9/2008 | Tsang | .............................. | 705/40 |
| 2010/0280873 A1* | 11/2010 | Bryant | .................... | G06Q 30/02 705/14.38 |
| 2011/0202471 A1* | 8/2011 | Scott | ....................... | G06Q 30/02 705/306 |

(Continued)

FOREIGN PATENT DOCUMENTS

WO WO-2004088552 A1 * 10/2004 ............. G07F 9/026
WO WO 2008020677 A1 * 2/2008

OTHER PUBLICATIONS

Rex Golden, Negotiable Instruments, 1993 (Year: 1993).*

*Primary Examiner* — Tarek Elchanti

(74) *Attorney, Agent, or Firm* — Schwegman Lundberg & Woessner, P.A.

(57) ABSTRACT

Various systems and apparatus for using quick response codes on negotiable instruments are described herein. A request may be received at a server from a user device, wherein the webpage request includes a sequence identifier, wherein the sequence identifier is associated with a two-dimensional barcode printed on a negotiable instrument. An advertisement from a plurality of advertisements may be selected based on the sequence identifier in the webpage request. The advertisement may be placed within an advertising portion of a webpage and the webpage may be transmitted to a user device.

16 Claims, 4 Drawing Sheets

(56) References Cited

U.S. PATENT DOCUMENTS

| | | | |
|---|---|---|---|
| 2011/0307318 A1* | 12/2011 | LaPorte | G06Q 20/209 705/14.33 |
| 2012/0158546 A1* | 6/2012 | Rothschild | G06Q 30/0625 705/26.62 |
| 2012/0181330 A1* | 7/2012 | Kim | G06O 30/02 235/375 |
| 2012/0187185 A1* | 7/2012 | Sayan | 235/375 |
| 2012/0209686 A1* | 8/2012 | Horowitz | H04L 67/02 705/14.26 |
| 2012/0272256 A1* | 10/2012 | Bedi | G06Q 30/0207 725/5 |
| 2012/0297024 A1* | 11/2012 | Grin et al. | 709/217 |
| 2012/0330845 A1* | 12/2012 | Kang | 705/71 |
| 2013/0006776 A1* | 1/2013 | Miller et al. | 705/14.65 |
| 2013/0060591 A1* | 3/2013 | Meegan | 705/7.19 |
| 2014/0100973 A1* | 4/2014 | Brown | G06Q 20/34 705/17 |
| 2014/0258158 A1* | 9/2014 | Levy | G06Q 50/01 705/319 |

* cited by examiner

METHOD AND APPARATUS FOR QUICK RESPONSE CODES FOR NEGOTIABLE INSTRUMENTS

BACKGROUND

Quick Response (QR) codes are one example of two-dimensional barcodes. The creator of the QR code encodes information in the QR code that is read by a QR code reader. The information may include a universal resource locator (URL), text, phone numbers, or instructions to send a text message. QR code readers may be installed on a mobile device such as cellular phone. The QR code reader may use a camera of the mobile device to scan a QR code and decode the information encoded in the QR code. Then, depending on the content, the mobile phone may launch a web browser and direct the web browser to a URL, display text, call a phone number, or send a text message.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present disclosure provides details on a method and apparatus for, among other things, using two-dimensional barcodes on negotiable instruments (e.g., checks) and other printed forms. Traditionally, checks and have not included advertising materials beyond a displayed website link to the manufacturer/sponsor of the check. In other words, any advertisement on the checks or forms would likely require a user to manually enter in the website address. Furthermore, the advertisement may be limited by the physical space available on the check. In contrast, the use of two-dimensional barcodes allows for more information to be included in a small area as well as reduces the actions a user takes to reach the website. By reducing the necessary actions, a user may be more likely to go the website.

For example, consider a check that includes a printed two-dimensional barcode. Two-dimensional barcodes may include encoded information that is retrievable when using a two-dimensional barcode reader. One form of two-dimensional barcodes is the QR code. QR codes come in many sizes and resolutions. The larger the size or higher the resolution, the more information that may be encoded in the QR code. In various embodiments, the QR code that is printed on the check is for a URL (i.e., a website). A viewer of the check may use a QR code reader to scan the QR code. Upon scanning the code, the QR code reader may open a browser on the mobile phone and direct it towards the decoded website address. Thus, with minimal input from the viewer, the viewer is transported to the website. The website may then display marketing materials, surveys, videos, or other content. More detailed uses of QR codes are discussed herein. Additionally, other barcode types or graphical coding schemes may also be used such as Data Matrix, Aztec Code, and EZcode, without departing from the scope of this disclosure.

Figure 1:
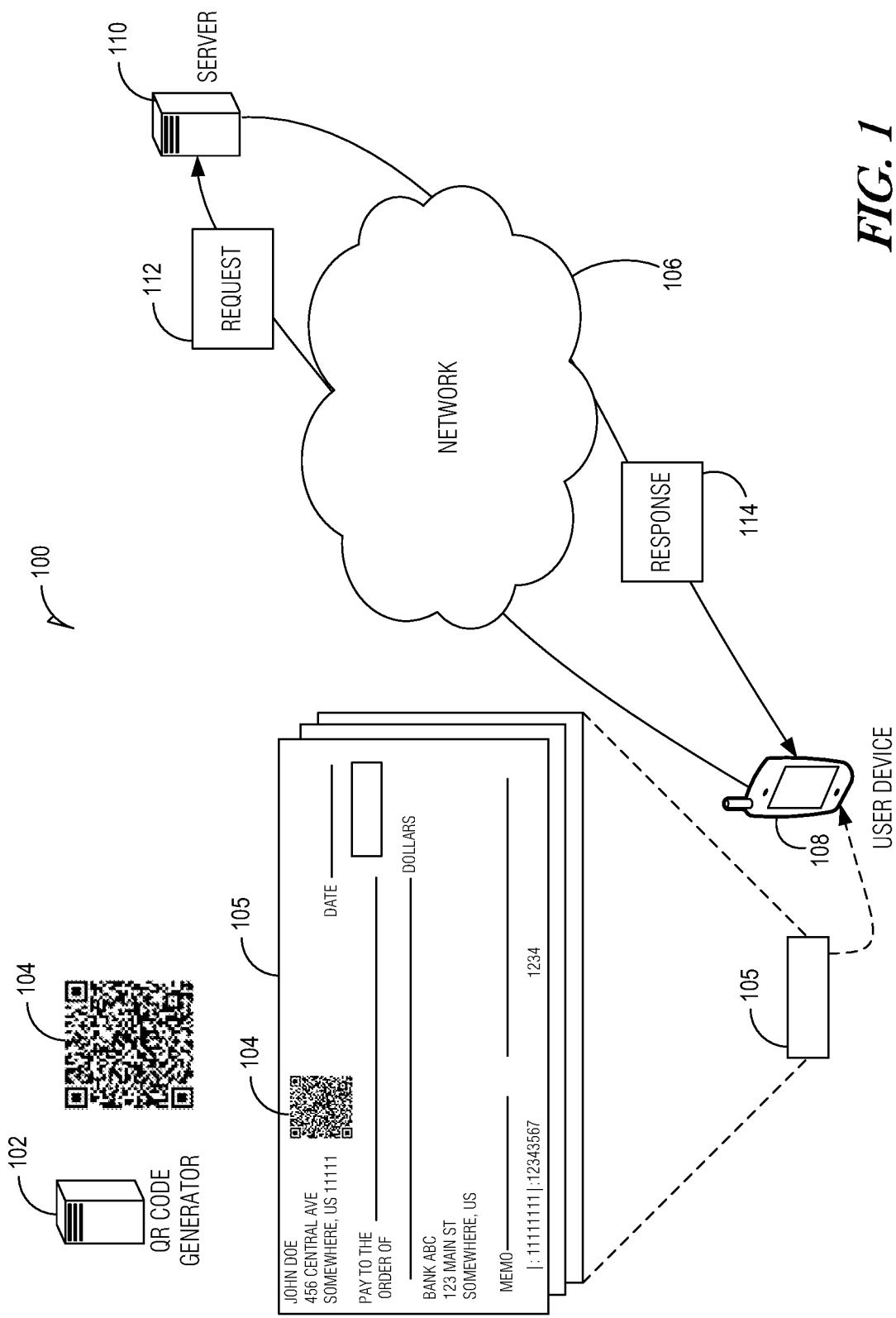
FIG. 1 is a schematic diagram illustrating a system for using two-dimensional codes on negotiable instruments.

FIG. 1 is a diagram illustrating system 100 for using two-dimensional codes on negotiable instruments or other printed materials. System 100 includes QR code generator 102, QR code 104, negotiable instrument 105, network 106, user device 108, server 110, request 112, and response 114. As used within this document, a client may refer to a company or person that distributes negotiable instruments. For example, a client may include a bank or producer of checks. In various embodiments, a client may also refer to a company that brands checks or wants -dimensional codes on printed materials but is not the actual producer. In an embodiment, a viewer or user is a person that scans a QR code. For example a user may be an initial recipient of a negotiable instrument (e.g., the person who ordered the negotiable instrument) or a person who receives a filled out negotiable instrument. Also, a system provider may refer to the one or more entities that collectively manage generating the QR codes and maintaining server 110. In various embodiments, a client may also be the system provider.

In various embodiments, QR code generator 102 generates one or more QR codes for use on negotiable instruments or printed materials. Generating includes encoding one or more pieces of information into the QR code. In various embodiments, QR code 104 may include one or more of a link address, a sequence identifier, the client identifier, and a user identifier.

In an embodiment, a link address is a URL for a website (e.g., http://www . . . ). The website may be managed by the system provider, the client, or a third-party. In an embodiment, the website may be formatted for small form devices such as mobile phones. Formatting may include limiting the resolution of images on the website as well as limiting the amount of information shown on the website. The website may be served from web server 110. The website may provide different information in various embodiments. For example, consider a QR code that is encoded with a website address managed by the system provider. The system provider may sell advertising space on the website to one or more advertisers. These advertisers may also be clients of the system provider. In some embodiments, the system provider may manage a website on behalf of a client. Thus, the website may offer details on products offered by the client.

In an embodiment, a sequence identifier identifies the location of a negotiable instrument within a series of negotiable instruments. For example, negotiable instrument 105 may be at check. The check may be one of many numbered checks in a checkbook or set of business checks. The sequence identifier may identify the number of the check within the series or may provide a relative location within the series of checks. For example, the sequence identifier may be "1/50" signifying that the check is the first check in a series of fifty checks.

In various embodiments, the sequence identifier is a relative location such as "beginning," "middle," or "end." The values corresponding to these relative locations may be set by the system provider or other administrator. For example, "beginning" may signify a check within the first ten checks and "end" may be a check within the last ten checks. Values may also be based on percentages such as "beginning" corresponding to the first 10% in the series. In yet another embodiment, the sequence identifier may indicate how many checks remain in the series after the current check (i.e., the check with the QR code).

In various embodiments, the sequence identifier is encoded as a variable associated with the website address. For example, QR code 104 may be encoded with "http://www . . . /page.html?seq_id=end" or "http://www . . . /page.html?seq_id=1from50." While shown in plain text above, the variables may also be encrypted.

In an embodiment, QR code 104 may include a client identifier. The client identifier may be an alphanumerical identifier associated with the client of the system provider. For example, the client identifier may be for an advertiser. In an example, the client identifier is a branded entity name of the negotiable instrument. As with the sequence identifier, the client identifier may be encoded in QR code 104 as a variable associated with the website address (e.g., "http://www . . . /page.html?client_id=123"). As will be discussed further, including the client identifier as a variable may allow web server 110 to return the proper website to a requesting device.

In an embodiment, QR code 104 includes a user identifier. User identifier may be an alphanumerical identifier associated with an end-user of the negotiable instrument. In various embodiments, the user identifier include identifying information (e.g., name, account number) of the receiver of the set of checks. In other embodiments, the user identifier does not identify the actual user of the negotiable instrument by personal information, but instead identifies the user by a random ID. Thus, in some embodiments, the user identifier for a person may change from one set of checks to another set of checks. As with the sequence identifier, the user identifier may be encoded in QR code 104 as a variable associated with the website address (e.g., "http://www . . . /page.html?user_id=12345"). As will be discussed further, including the user identifier as a variable may allow web server 110 to return the proper website to a requesting device.

In an embodiment, user device 108 is a smartphone, cellular telephone, mobile phone, laptop computer, desktop computer, tablet computer, or other network enabled device. In various embodiments, user device 108 includes a reader application for reading two-dimensional barcodes. For example, the application may utilize an internal camera of user device 108 to take a picture of QR code 104 on negotiable instrument 105. In various embodiments, an external image capture device (e.g., a camera) is communicatively coupled to user device 108. The image capture device may take a picture of QR code 104 on negotiable instrument 105.

In various embodiments, the picture of the QR code is stored on user device 108 for analysis by the reader application. The analysis may include decoding QR code 104 to determine the contents of QR code 104. For example, decoding QR code 104 may result in a link address with one or more variables. These variables may include a client identifier, a sequence identifier, and a user identifier as discussed herein.

In various embodiments, user device 108 includes a browsing application that may send a request 112 to the link address encoded within QR code 104. The reader application may automatically open the browsing application and send a request to the decoded link address after the analysis. In an embodiment, a user prompt is presented on user device 108 requesting permission to send the request. If the QR code includes a variable, request 112 may also include the variable.

In an embodiment, request 112 is sent to server 110 via network 106. Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. Network 106 may include a single local area network (LAN) or wide-area network (WAN), or combinations of LANs or WANs, such as the Internet. The various devices coupled to network 106 may be coupled via one or more wired or wireless connections.

Server 110 may communicate with internal databases or file servers to publish or serve files via a web server. The web server may consist of scripts, applications, or library files that provide primary or auxiliary functionality to the web server (e.g., multimedia, file transfer, or dynamic interface functions). The web server, either alone or in conjunction with one or more other computers, may provide (e.g., transmit) a user-interface to a user of user device 108. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

Server 110 may represent a group of two or more servers, cooperating with each other, provided by way of a pooled, distributed, or redundant computing model. Further, server 110 may be implemented as a distributed system; for example, one or more elements of server 110 may be located across a wide-area network from other elements of server 110. In various embodiments, information stored in server 110 is received from the system provider.

Figure 2:
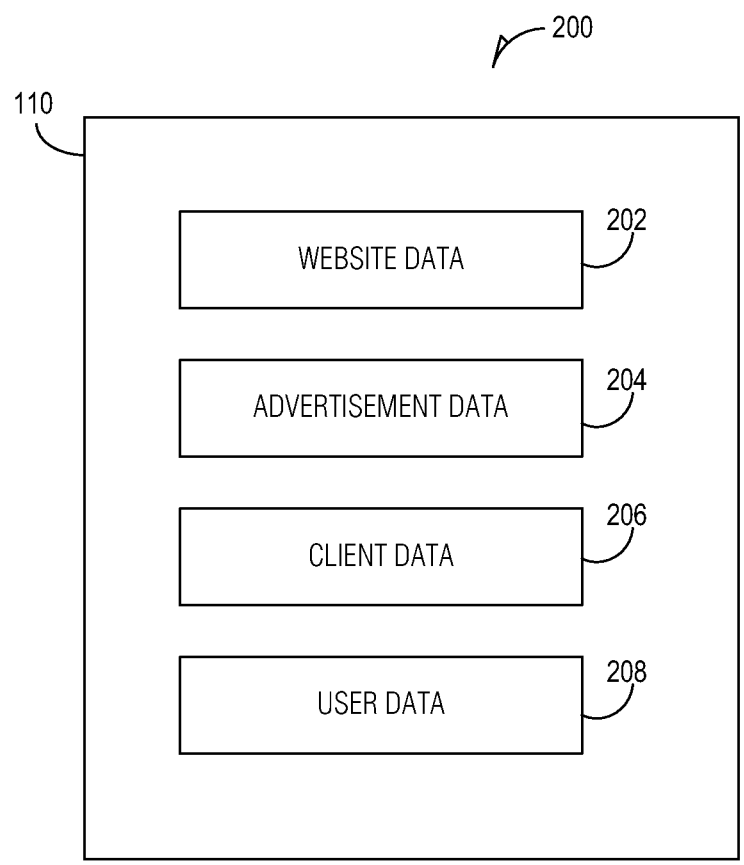
FIG. 2 is a block diagram of a server, according to an example embodiment.

FIG. 2 is a block diagram 200 of server 110, according to an example embodiment. Server 110 includes components website data 202, advertisement data 204, client data 206, and user data 208. The data of the components may be stored in one or more databases. The databases may include one or more logical or physical databases. In an embodiment, website data 202, advertisement data 204, client data 206, and user data 208 may be viewed as a system of databases that when viewed as a compilation, represent an "operations database. The operations database may be implemented as a relational database, a centralized database, a distributed database, an object oriented database, or a flat database in various embodiments.

Website data 202 may include the data that is ultimately transmitted back to user device 108. For example website data 202 may include a number of webpages. The contents of the webpages may be based on advertisement data 204, client data 206, user data 208, as well as variables included in request 112. Thus, a webpage may not be completed for delivery to user device 108 until after request 112 is received. The webpage may be conceptualized as having one or more portions. These portions may include an advertising portion and a promotional portion in which different advertisements or promotions may, respectively, be placed.

Advertisement data 204, in an embodiment, includes data for one or more advertisements that are placed on a webpage. These advertisements may be associated with one or more clients, users, and sequence identifiers. In an embodiment, an advertisement is associated with a single client. Client data 206, in an embodiment, includes data identifying specific client requests as well as client identifiers. User data 208 an example embodiment, includes user identifications and associated point totals. These point totals may increase when a request is received at server 110 with a link address that includes a user identifier variable as discussed in more detail herein. In an embodiment, different advertisements may be displayed for different point totals.

In various embodiments, the components of server 110 are used in generating response 114 to transmit to user device 108. Because of the flexibility in the system, the nature of how response 114 is generated depends on a variety of factors. A few examples of how server 110 may respond are discussed below. These examples will use QR codes printed on negotiable instruments, however, other printed media may also be used. Additionally, many examples include promotional (e.g., offers for goods) and advertising material being incorporated into a webpage. The promotional and advertising material may change periodically (e.g., daily, monthly) to encourage repeat visits. Promotional content and advertisements may take many forms, including but not limited to, picture, video, application (e.g., an interactive advertisement), and alphanumerical. Lastly, these variations are discussed as various embodiments, however, they may be combined without departing from the scope of the present disclosure.

In an example embodiment, the system provider is a producer of negotiable instruments. Each negotiable instrument may have the same QR code printed on a portion of the negotiable instrument. The QR code may include a link address. The system provider may then sell advertisements that are placed on a webpage corresponding to the link address. The sale may include a bidding process. In order to encourage users of the negotiable instrument read the QR codes, the webpage may also include discounted purchases of goods such as business supplies. Thus, server 110 may receive a request for the webpage associated with the link address with no variables included in the request. Server 110 may then choose an advertisement from advertisement data 204 and place it within an advertising portion of the webpage according to the previously conducted sale. The webpage with the advertisement may then be sent back to user device 108.

In an example embodiment, the system provider runs a website on behalf of a client that has branded negotiable instruments. The negotiable instruments with the branding of the client may include a QR code encoded with a link address and a client identifier variable corresponding to the client. In an embodiment, the branding may be for the distributor of the check (e.g., a bank) or a business (e.g., business checks for realtors). The link address may be a generic link address such that clients of the system provider use the same link address, but different client identifiers. Then, when server 110 receives request 112 from user device 108 the request will include the client identifier. Server 110 may then access client data 206 to determine preferences for response associated with the client identifier. For example, the preference may detail which webpage and which promotions/advertisement to use for response 114. The webpage may include products or promotions offered by the client, for example. In an embodiment, a client specific link address may be used without the need for the client identifier variable. Upon determining the correct webpage (e.g., either a client specific page or a generic branded version) to use, one or more advertisements may be retrieved from advertising data 204 in place of the webpage as discussed above. In various embodiments, no advertisements are placed on the webpage. The webpage may be transmitted in response 114 to user device 108.

In an embodiment, the system provider allows for variations in the QR codes in a series of negotiable instruments. For example, consider a checkbook of 50 checks. Each check may use a different QR code or the checkbook may be split into various portions (e.g., The first 10, the second 10, etc.). Different advertisers may wish to advertise according to different locations in a checkbook. For example, users of the checks may be more likely to scan a QR code on a check near the beginning and end of the checkbook. With respect to the beginning, it may be because the idea appears novel in the user wishes to see where the QR code will take them. With respect to the end, it may be because the user is looking for a discount to reorder checks.

Accordingly, the QR codes on the checks may include a link address with a sequence identifier variable. In various embodiments, server 110 receives a request for webpage associated with the link address. The request may include a sequence identifier encoded in a QR code. Server 110, may then choose advertisements that are associated with the sequence identifier. For example, the system provider may sell advertisements according to the sequence identifiers. Thus, different advertisements may be included in portions of the webpage according to the sequence identifiers. Additionally, clients may wish to change the content of a webpage based on the sequence identifier. For example if the sequence identifier indicates the QR code is from a check at the end of a series of checks, the webpage may include an offer for discounted purchases of checks.

In various embodiments, as an incentive to encourage users to scan the QR codes, reward points may be accumulated upon visiting the link addresses encoded in the QR codes. To account for the points, the QR codes may be encoded with a user identification as discussed previously. When server 110 receives a request with the user identification variable, server 110 may update an entry associated with the user identification in user data 208. The update may include increasing a point total stored in the entry (e.g., by ten points). In an embodiment, to account for the fact that a user may repeatedly scanning QR code to increase his or her point total, a unique identification may also be encoded in the QR code. If server 110 receives a link address request with an already received unique identification, the point total may not be increased. In various embodiments, the webpage served to user device 108 may be based on the point total associated with the client identifier. For example, when the point total reaches a certain threshold (e.g., 50 points), an offer may be presented in the webpage to redeem those points for a discount on a check reorder or other merchandise.

In various embodiments, server 110 may also generate reports based on the received requests from user devices. For example, server 110 may compile the number of requests per day for each client and transmit the report to the client. The report may also include which advertisements were transmitted, whether a user interacted (e.g., clicked) with the advertisement, and what purchases were made on the webpage.

Figure 3:
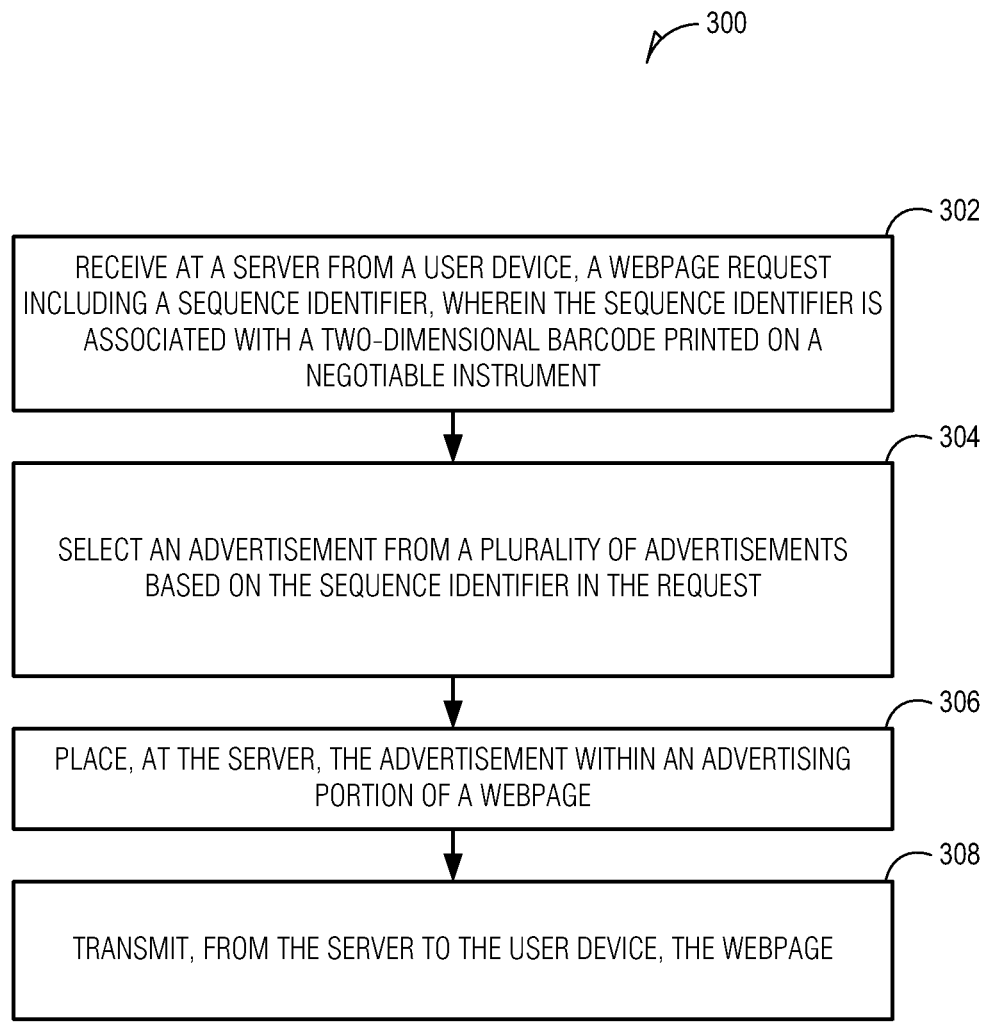
FIG. 3 is a flowchart illustrating a method for using two-dimensional codes on a negotiable instrument, according to an example embodiment.

FIG. 3 is a flowchart illustrating a method for using two-dimensional codes on a negotiable instrument, according to an example embodiment.

At block 302, in an embodiment, a request is received at a server from a user device, wherein the webpage request includes a sequence identifier and wherein the sequence identifier is associated with a two-dimensional barcode printed on a negotiable instrument. In an embodiment, the request includes a client identifier. In an embodiment, the request includes a user identifier.

At block 304, in an embodiment, an advertisement from a plurality of advertisements is selected based on the sequence identifier in the webpage request. The sequence identifier may identify a location of the negotiable instrument in a series of negotiable instruments. The location may be a relative location within the series. The location may be a number identifying the number of negotiable instruments that come after the negotiable instrument in the series of negotiable instruments.

In an embodiment, the advertisement is retrieved from advertisement data that stores the plurality of advertisements. The advertisements may be associated with one or more sequence identifiers, client identifiers, and user identifiers. Thus, depending on which sequence identifiers, client identifiers, and user identifiers are included in the request, different advertisements may be included. Similarly, one or more pieces of promotional content (e.g., product offerings) and informational content may be associated with one or more sequence identifiers, client identifiers, and user identifiers. In an embodiment, a reorder advertisement may be associated with an end sequence identifier.

In various embodiments, a point total may be incremented (e.g., increased) in a user entry associated with a user identifier. If the point total is over a threshold, a coupon may be transmitted to the user device. The coupon may be included in the webpage or may be sent via other electronic methods (e.g., e-mail, SMS, MMS, etc).

At block 306, in an embodiment, the advertisement is placed within an advertising portion of a webpage. In an embodiment, the placement of the advertisement is considered formatting the webpage. For example, a webpage may include one or more advertising portions where advertisements may be placed. Placement may include adding the code (e.g., markup language, javascript, etc) to the advertising portion for the selected advertisement. Different advertisements may be placed in each advertising portion. Similarly, promotional content may be placed in one or more promotional portions of the webpage.

At block 308, in an embodiment, the webpage is transmitted to the user device from the server. In various embodiments, the webpage includes one or more advertisements and promotions as discussed above.

In various embodiments, the server receives an indication of whether or not the user has interacted (e.g., clicked) an advertisement or promotion. This may include receiving a further request from the user device where the request is for a link that has been presented in the advertisement or promotion. The server may generate a report that includes details on what advertisements and promotions have been sent to the user device and any interactions with the advertisements and promotions.

The above embodiments and examples may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 4:
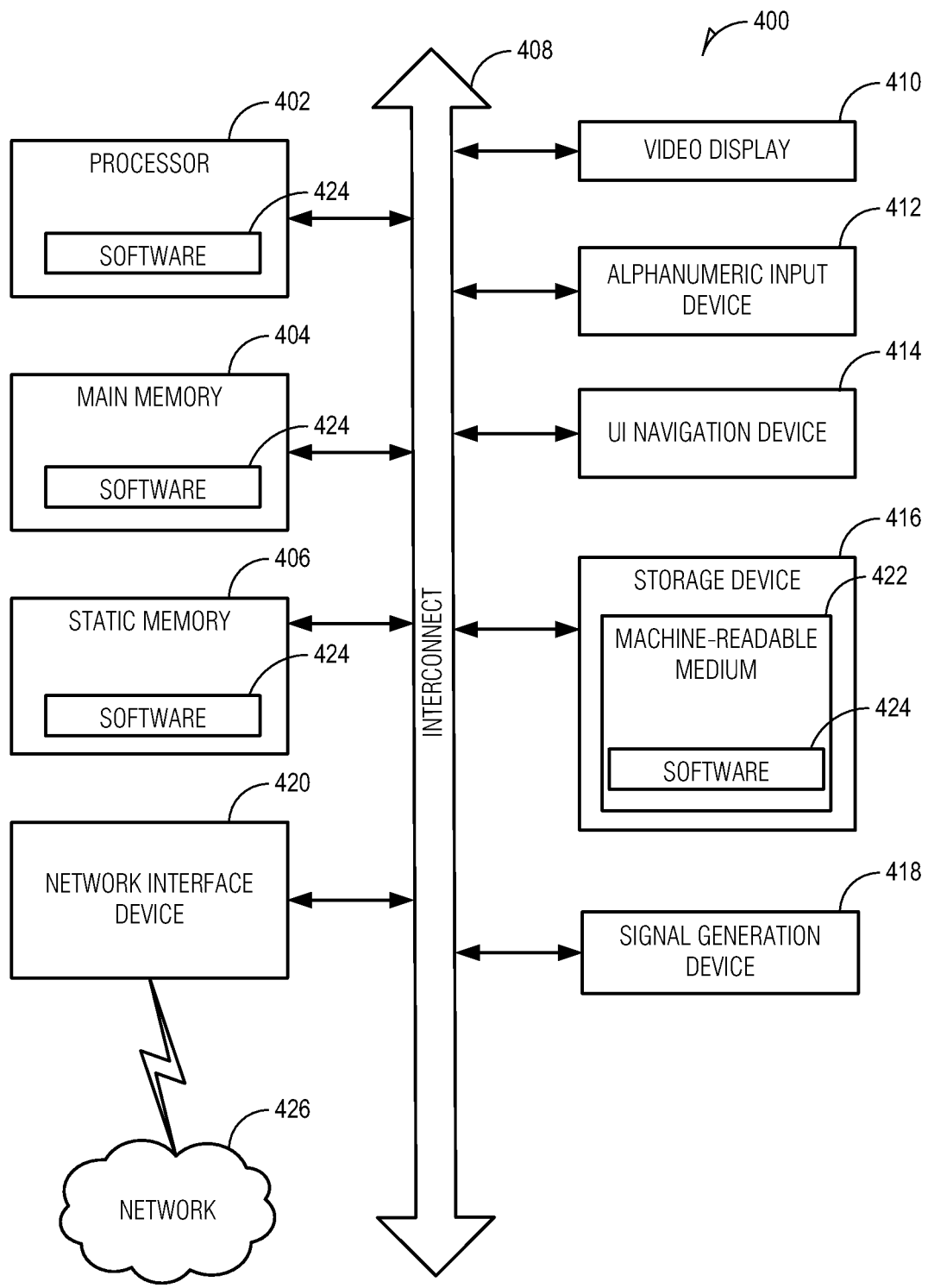
FIG. 4 is a block diagram illustrating a machine in the example form of a computer system, within which a set or sequence of instructions for causing the machine to perform any one of the methodologies discussed herein may be executed, according to an example embodiment.

FIG. 4 is a block diagram illustrating a machine in the example form of a computer system 400, within which a set or sequence of instructions for causing the machine to perform any one of the methodologies discussed herein may be executed, according to an example embodiment. In alternative embodiments, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes processor 402 (e.g., a general purpose processing unit, a graphics processing unit (GPU) or both), main memory 404, and static memory 406, which communicate with each other via interconnect 408 (e.g., a bus or link). Computer system 400 may further include video display 410, alphanumeric input device 412 (e.g., a keyboard), and user interface (UI) navigation device 414 (e.g., a mouse). In one embodiment, video display 410, input device 412, and UI navigation device 414 are incorporated into a touch screen display. Computer system 400 may additionally include storage device 416 (e.g., a drive unit), signal generation device 418 (e.g., a speaker), network interface device 420, and one or more sensors (not shown), such as a global positioning system (GPS) sensor, compass, accelerometer, or other sensor.

Storage device 416 includes machine-readable medium 422 (i.e., machine-readable storage device) on which is stored one or more sets of data structures and instructions 424 (e.g., software) embodying or utilized by any one or more of the methodologies or functions described herein. Instructions 424 may also reside, completely or at least partially, within main memory 404, static memory 406, and/or within processor 402 during execution thereof by computer system 400, with main memory 404, static memory 406, and processor 402 also constituting machine-readable media.

While machine-readable medium 422 is illustrated in an example embodiment to be a single medium, the term "machine-readable medium" may include a single medium or multiple media (e.g., a centralized or distributed database, and/or associated caches and servers) that store one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Instructions 424 may further be transmitted or received over communications network 426 using a transmission medium via network interface device 420 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

What is claimed is:

1. A method comprising:
receiving at a server from a user device, a webpage request including a sequence identifier, wherein the sequence identifier is encoded in a two-dimensional barcode printed on a negotiable instrument;
at the server, interpreting barcode information in the webpage request to determine the sequence identifier to generate a value corresponding to where the sequence identifier lies within an ordered range of a plurality of sequence identifiers and wherein the value describes the relative location of the negotiable instrument within the series of negotiable instruments, and wherein the relative location identifies a remaining number of negotiable instruments within the series of negotiable instruments that come after the negotiable instrument within the series of negotiable instruments;
at the server, interpreting the webpage request to determine requested webpage content based on the value;
generating a webpage, at the server, using the requested webpage content, such that when the webpage is viewed by a user, the webpage provides information unique to the value; and
serving the webpage to the user device, according to the webpage request, wherein the information unique to the value that is provided in the webpage served to the user device is different than information unique to a second value that is based on a second two-dimensional barcode printed on a second negotiable instrument in the series of negotiable instruments.

2. The method of claim 1 wherein the value includes the number of negotiable instruments in the series of negotiable instruments that come after the negotiable instrument in the series of negotiable instruments.

3. The method of claim 1, wherein the requested webpage content includes a reorder advertisement when an end position is identified by the sequence identifier, the reorder advertisement including an offer to purchase additional negotiable instruments.

4. The method of claim 1, further comprising:
determining if the webpage was interacted with by a user;
generating a report including a result of the determination; and
transmitting the report to a recipient.

5. The method of claim 1, wherein the two-dimensional barcode is further encoded with a user identification.

6. The method of claim 5, further in response to the request:
incrementing a point total of a user entry associated with the user identification; and
when the point total is over a threshold, transmitting a coupon to the user device.

7. A system comprising:
a web server including at least one processor, the web server configured to:
receive from a user device, a webpage request including a sequence identifier, wherein the sequence identifier is encoded in a two-dimensional barcode printed on a negotiable instrument;
interpret barcode information in the webpage request to determine the sequence identifier to generate a value corresponding to where the sequence identifier lies within an ordered range of a plurality of sequence identifiers and wherein the value describes the relative location of the negotiable instrument within the series of negotiable instruments, and wherein the relative location identifies a remaining number of negotiable instruments within the series of negotiable instruments that come after the negotiable instrument within the series of negotiable instruments;
interpret the webpage request to determine requested webpage content based on the value;
generate a webpage, at the server, using the requested webpage content, such that when the webpage is viewed by a user, the webpage provides information unique to the value; and
serve the webpage to the user device, the webpage according to the webpage request, wherein the information unique to the value that is provided in the webpage served to the user device is different than information unique to a second value that is based on a second two-dimensional barcode printed on a second negotiable instrument in the series of negotiable instruments.

8. The system of claim 7, wherein the webpage request includes a client identifier and the web server is configured to format the webpage according to preferences associated with the client identifier.

9. The system of claim 8, wherein the preferences include a preference to include product offers associated with the client in the webpage.

10. The system of claim 7, wherein the webpage request includes a user identification and the web server is configured to:
retrieve a user entry from user data associated with the user identification, the user entry including a point total;
increase the point total; and
responsive to the increased point total exceeding a threshold, format the webpage with a promotional offer.

11. The system of claim 7, wherein the requested webpage content includes a video advertisement.

12. The system of claim 7, wherein the webpage includes a survey.

13. A non-transitory machine-readable storage device with instructions stored thereon, which when executed by at least one processor, cause the at least one processor to:
receive at a server from a user device, a webpage request including a client identifier and a sequence identifier, wherein the client identifier and the sequence identifier are encoded in a two-dimensional barcode printed on a negotiable instrument;

at the server, interpret barcode information in the request to determine the sequence identifier to generate a value corresponding to where the sequence identifier lies within an ordered range of a plurality of sequence identifiers and wherein the value describes the relative location of the negotiable instrument within the series of negotiable instruments, and wherein the relative location identifies a remaining number of negotiable instruments within the series of negotiable instruments that come after the negotiable instrument;

at the server, interpret the webpage request to determine requested webpage content based on the value and the client identifier;

generate a webpage, at the server, using the requested webpage content, such that when the webpage is viewed by a user, the webpage provides information unique to the value and the client identifier; and serve the webpage to the user device, according to the webpage request, wherein the information unique to the value that is provided in the webpage served to the user device is different than information unique to a second value that is based on a second two-dimensional barcode printed on a second negotiable instrument in the series of negotiable instruments within the series of negotiable instruments.

14. The storage device of claim 13, wherein the instructions cause the at least one processor to:

determine if the webpage was interacted with by a user;

generate a report including a result of the determination; and transmit the report to a recipient.

15. The method of claim 1, wherein serving the webpage to the user device serving website data, advertisement data, and client data, wherein the website data, the advertisement data, and the client data are retrieved from one or more databases.

16. The method of claim 15, wherein the requested webpage content includes the advertisement data and the client data.

* * * * *